United States Patent [19]

Suzuki et al.

[11] Patent Number: 4,984,239

[45] Date of Patent: Jan. 8, 1991

[54] AUTOMATIC VERIFICATION SYSTEM FOR MAINTENANCE/DIAGNOSIS FACILITY IN COMPUTER SYSTEM

[75] Inventors: Kaoru Suzuki; Mamoru Kaneko; Matsukichi Kanari, all of Hadano, Japan

[73] Assignees: Hitachi, Ltd., Tokyo; Hitachi Electronics Service Co., Ltd., Kanagawa, both of Japan

[21] Appl. No.: 293,492

[22] Filed: Jan. 4, 1989

[30] Foreign Application Priority Data

Jan. 13, 1988 [JP] Japan .................................. 63-5366

[51] Int. Cl.[5] ........................................... G06F 11/00
[52] U.S. Cl. ..................................... 371/3; 371/16.1; 371/18
[58] Field of Search .......................... 371/3, 16.1, 18; 364/200, 900

[56] References Cited

U.S. PATENT DOCUMENTS

| | | | |
|---|---|---|---|
| 3,465,132 | 9/1969 | Crockett et al. | 371/3 |
| 4,669,081 | 5/1987 | Mathewes, Jr. et al. | 371/3 |
| 4,759,019 | 7/1988 | Bentley et al. | 371/3 |
| 4,779,271 | 10/1988 | Suzuki | 371/3 |

*Primary Examiner*—Charles E. Atkinson

*Attorney, Agent, or Firm*—Antonelli, Terry, Stout & Kraus

[57] ABSTRACT

An automatic verification system for a maintenance/diagnosis facility in a computer system comprising a host computer and a service processor for performing maintenance/diagnosis of the host computer. The host computer includes a fault detecting facility and the service processor includes a fault cause analyzing/processing facility and a fault cause analysis data storing file. The fault cause analyzing/processing facility automatically retrieves on a software basis the fault cause analysis data with high efficiency and accuracy to improve accuracy and efficiency of the test. Through a multi-run of a verification program and a random sequence test program by which a variety of instruction strings based on a random sequence are generated and executed, faults generated at sophisticated timings inherent to a computer using acceleration logic adapted for parallel execution of a plurality of instructions can be simulated to realize a wide range of operation of the fault detecting facility and a wide range of verification for the fault cause analyzing/processing facility. With the above construction, the automatic verification system can efficiently perform automatic verification for the fault detecting facility and the fault cause service facility throughout the whole of the processing sequence.

14 Claims, 6 Drawing Sheets

AUTOMATIC VERIFICATION SYSTEM FOR MAINTENANCE/DIAGNOSIS FACILITY IN COMPUTER SYSTEM

BACKGROUND OF THE INVENTION

The present invention relates to a system for automatically verifying a facility adapted to analyze and process a cause of fault, or a similar facility, which is built in a service processor (SVP), and more particularly to an automatic verification system suitable for evaluating a fault cause analyzing/processing facility adapted for a large-scale fault detecting facility in a super computer or similar device.

Conventionally, when a fault detecting facility and a fault cause analyzing/processing facility are examined in a computer system comprised of a host computer and a service processor, a scan-in of error data to the host computer is carried out manually using the function of the service processor to generate a fault. Furthermore, upon generation of the fault, fault data analyzed by means of the fault cause analyzing/processing facility is extracted, for example, by displaying the contents of hardware resources on a console through a framing operation of the service processor, and then such displayed contents are visually verified. A relevant fault generation system is disclosed, for example, in JP-A-60-74049.

However, in the computer system, acceleration logic, as represented by parallel operation logic and pipe line control, is employed in order to realize the speed-up of processings. In this type of computer, a sequenced instruction string is not executed in series, but instead a plurality of instructions are executed in parallel at a point on the time axis in such a manner that during execution of a preceding instruction, execution of the succeeding instruction is started.

Conventionally, in testing the computer system based on the acceleration logic, a fault- is generated manually at a fixed timing and therefore the test can be conducted for only limited types of fault detecting facilities. Further, since upon generation of a fault the fault cause analyzing data is retrieved from analysis data stored in a storage file and visually verified, improvements in test accuracy and efficiency are difficult to achieve. Especially, as far as the large-scale computer having a large-scale fault cause analyzing/processing facility is concerned, a test on the whole of the fault detecting facility and fault cause analyzing/processing facility in the environment of actual operation or execution of the computer system can not be permitted.

More specifically, in spite of the fact that in the system to be tested, actual faults take place at a variety of hardware operation timings while instructions constituting a given instruction string are being organically coupled together and executed in parallel, prior art devices generate a fault at a fixed hardware operation timing by executing only a fixed instruction string comprised of one to several instructions. This means that the environment of fault generation in the prior art differs from that in the actual computer system. For example, even when detecting errors by executing an instruction string in which instructions are organically coupled together to cause execution results of a preceding instruction to affect execution of a subsequently executed instruction (setting up the conflict condition), as in the case where the instruction to be executed is subsequently is rewritten on the basis of the preceding instruction, or execution results of the preceding instruction are used for the subsequently executed instruction, the prior art simply determines, in a single definite way, the organic coupling of individual instructions constituting the instruction string. More damagingly, the prior art has difficulties in preparing the instruction string per se standing for a fault generation means. As is clear from the above, the prior art is operable in only the fault generation environment which is different from the actual fault generation environment for the computer system and it disadvantageously fails to accurately verify the fault detecting facility and the fault cause analyzing/processing facility.

SUMMARY OF THE INVENTION

The present invention contemplates elimination of the above disadvantages of the prior art and has for its object to provide an automatic verification system which can test the fault detecting facility and the fault cause analyzing/processing facility of the computer system without resort to manual operation in the environment of actual operation of the computer system.

According to the invention, in a computer system comprising a host computer and a service processor for performing maintenance/diagnosis of the host computer, with the host computer including a fault detecting facility and the service processor including a fault cause analyzing/ processing facility and a fault cause analysis data storing file, there are provided a pseudo-fault generation control unit for scanning in error data used to generate a pseudo-machine check for the host computer and for controlling a pseudo-fault generating memory address, a fault recovery processing unit for performing a fault recovery processing when a pseudo-fault is generated, and analysis result detecting unit for retrieving and extracting results of an analysis conducted by the fault cause analyzing/processing facility from the fault cause analysis data storing file, and an analysis result verifying unit for comparing the analysis results with an expected value to perform verification. The generation of the pseudo-fault is effected by a multi-run of a verification program and a random sequence test program and analysis data concerning the fault generated thus is evaluated to automatically verify the fault detecting facility and the fault cause analyzing/processing facility.

The analysis result detecting unit reads the contents of a management table included in the fault cause analysis data storing file before and after generation of a fault and it retrieves a storage position of the analysis data in accordance with the difference in the contents and reads only that analysis data from the file. The above operation can dispense with unnecessary retrieval processings to improve efficiency and can automatically be done using software to improve accuracy of the test.

Further, since the generation of a fault is effected by a multi-run of the verification program and random sequence test program whereby after scan-in of error data, a variety of instruction strings based on random sequence are generated and executed, faults can be generated at sophisticated timings to realize a wide range of operation of the fault detecting facility and a wide range of verification for the fault cause analyzing/processing facility.

In accordance with the invention, even in the computer system using the acceleration logic represented by parallel operation logic and pipe line control, automatic verification of sophisticated faults generated in the environment of actual operation of the computer system can be ensured.

DESCRIPTION OF THE PREFERRED EMBODIMENT

The invention will now be described by way of example with reference to the accompanying drawings.

Figure 1:
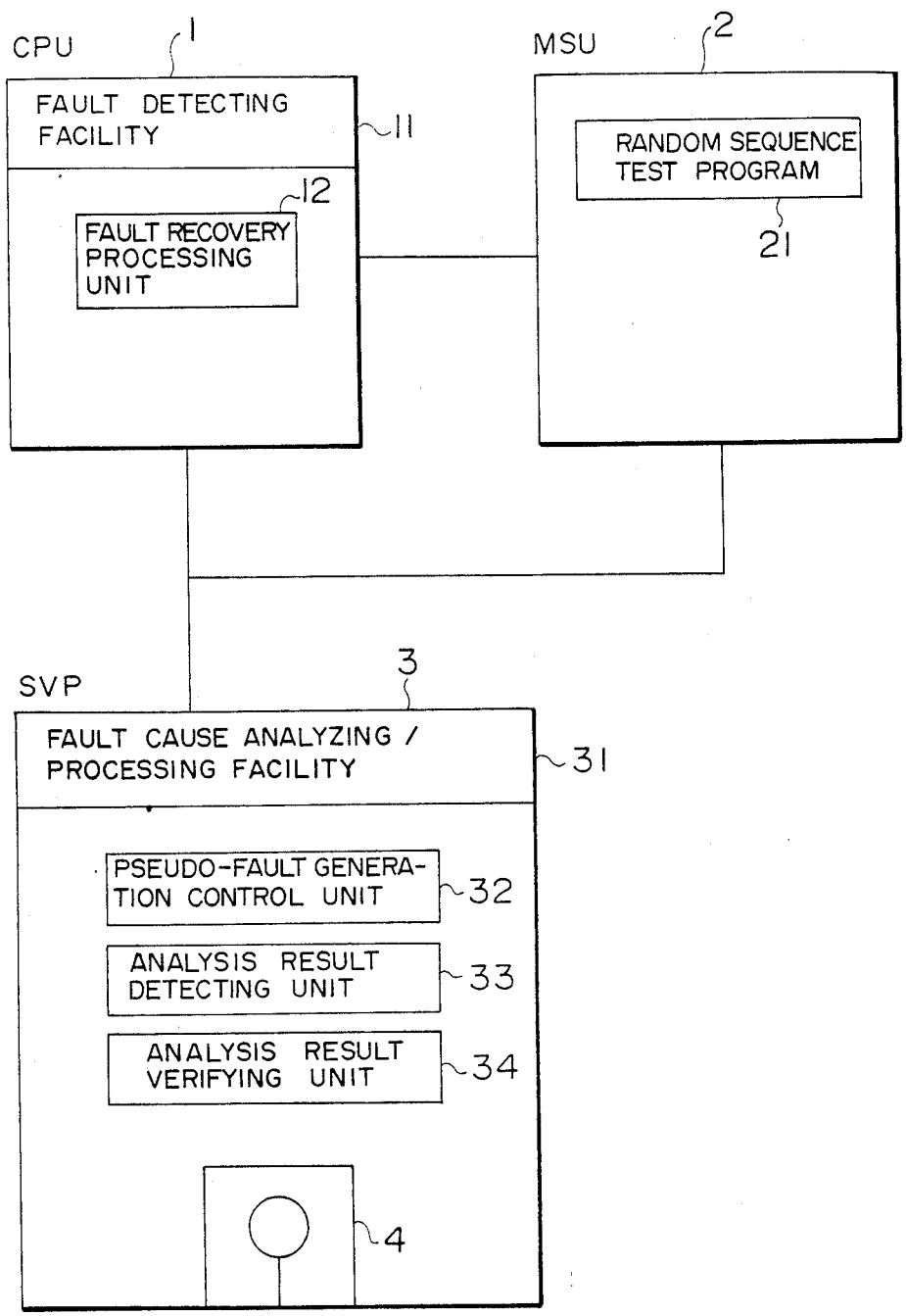
FIG. 1 is a block diagram illustrating a computer system with automatic verification system according to an embodiment of the invention.

Referring now to FIG. 1, there is illustrated, in block form, a computer system to which the invention is applied. The computer system comprises a host computer 1 (CPU), a main memory 2 (MSU), a service processor 3 for performing maintenance/diagnosis of the host computer 1, and a hardware disc unit 4 built in the service processor 3 and serving as a fault cause analysis data storing file or a management table. The host computer 1 includes a fault detecting facility 11 and the service processor 3 includes a fault cause analyzing/processing facility 31. The above construction resembles the prior art construction. In accordance with the invention, the host computer 1 additionally includes a fault recovery processing unit 12 for performing a fault recovery processing where a pseudo-fault is generated, a random sequence test program 21 is provided on the main memory 2, and the service processor 3 additionally includes a pseudo-fault generation control unit 32 for scanning in error data used to generate a pseudo-machine check to the host computer and for controlling a pseudo-fault generating memory address, an analysis result detecting unit for retrieving and extracting results of analysis conducted by the fault cause analyzing/processing facility from the fault cause analysis data storing file of the built-in hardware disc unit 4, and an analysis result verifying unit 34 for comparing the analysis results with an expected value to perform verification.

Figure 2:
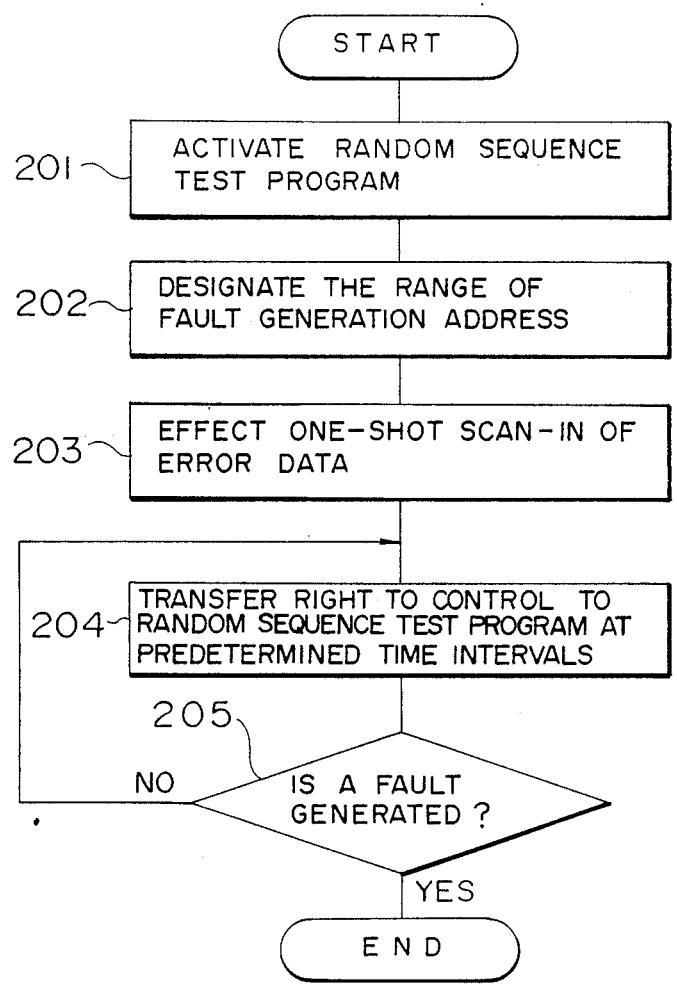
FIG. 2 is a flow chart showing processings in a pseudo-fault generation control unit of the computer system with the automatic, verification system of the invention.
Figure 3:
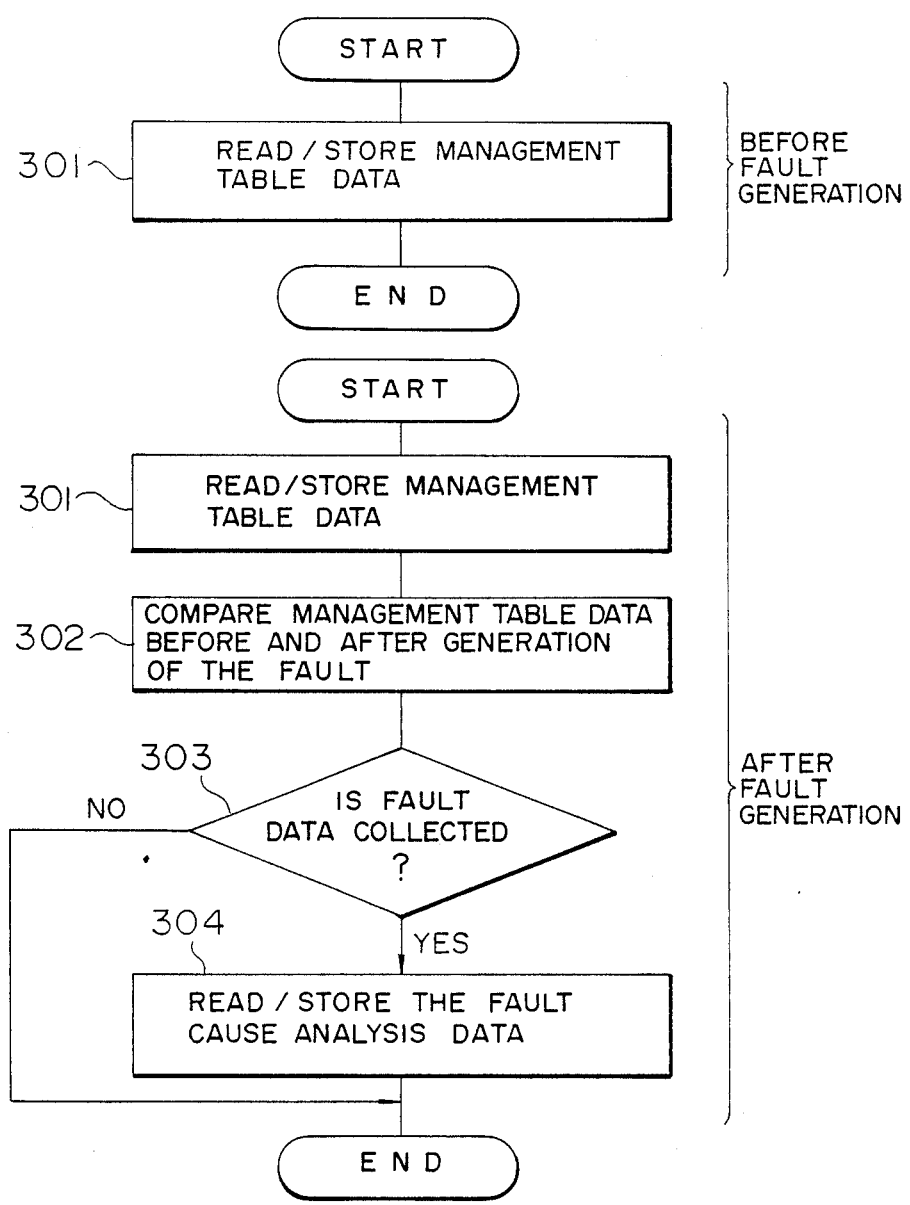
FIG. 3 is a flow chart showing processings in an analysis result detecting unit of the computer system with the automatic verification system of the invention.
Figure 4:
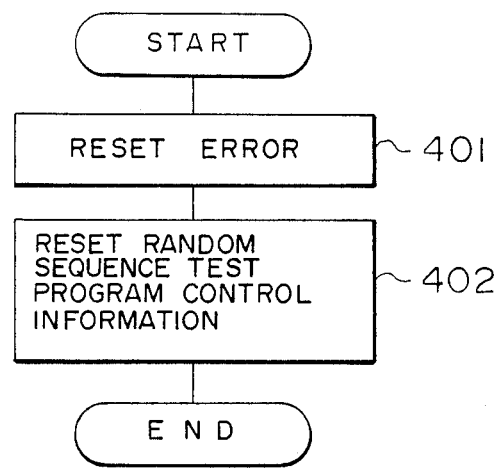
FIG. 4 is a flow chart showing processings in a fault recovery processing unit of the computer system with the automatic verification system of the invention.
Figure 5:
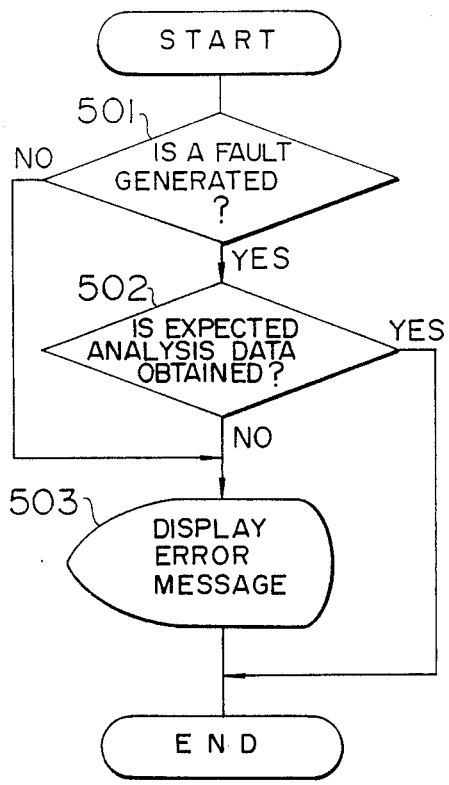
FIG. 5 is a flow chart showing processings in an analysis result verifying unit of the computer system of the invention.
Figure 6:
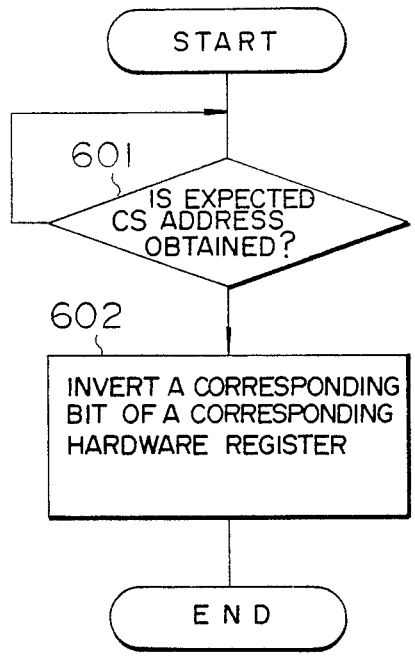
FIG. 6 is a flow chart showing an one-shot scan-in operation of hardware of the computer system with the automatic verification system according to the invention.
Figure 7:
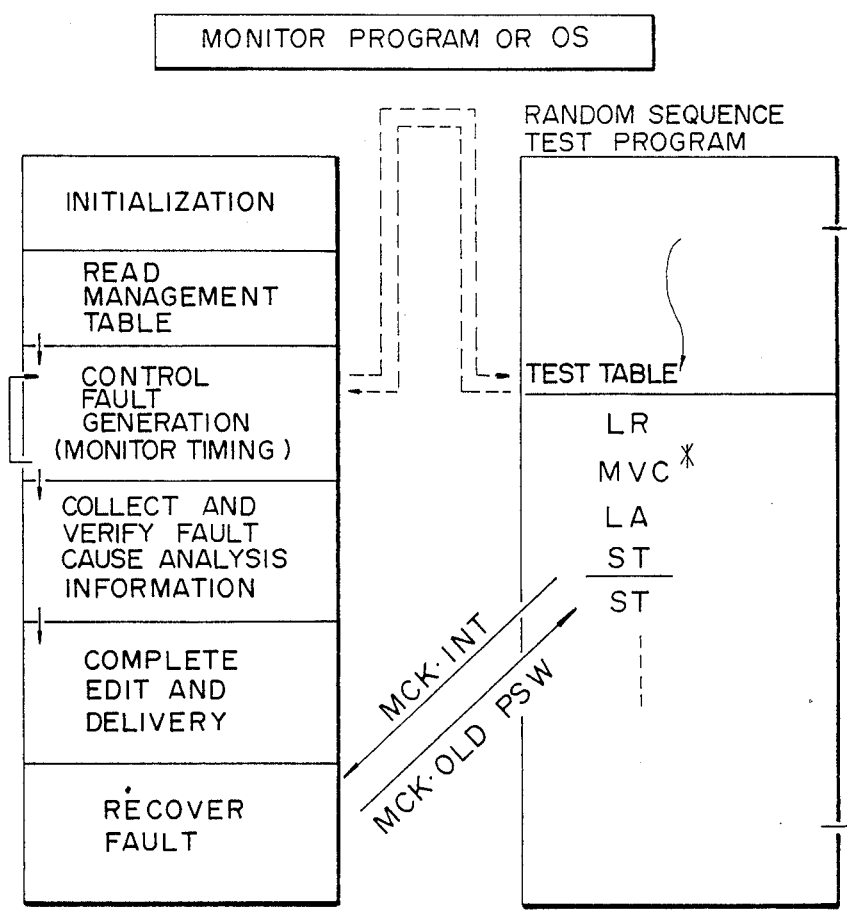
FIG. 7 is a diagrammatic representation showing an interface between a random sequence test program and each processing unit of the computer system with the automatic verification system of the invention.

The pseudo-fault generation control unit 32 carries out processings in accordance with a flow chart as shown in FIG. 2, the analysis result detecting unit 33 carries out processings in accordance with a flow chart as shown in FIG. 3, the fault recovery processing unit 12 carries out processings in accordance with a flow chart as shown in FIG. 4, the analysis result verifying unit 34 carries out processings in accordance with a flow chart as shown in FIG. 5, the one-shot scan-in operation of the hardware is performed in accordance with a flow chart as shown in FIG. 6, and the random sequence test program 21 accesses each unit through interface as shown in FIG. 7.

The operation of the system upon generation of a fault will first be described. When the fault detecting facility 11 of the host computer 1 detects a fault, the host computer 1 informs the service processor 3 of the fault detection through machine check interruption. The service processor 3, being in receipt of this information activates a machine check handler to cause it to collect fault information, writes the collected fault information in a fault information file of the built-in hardware disc unit 4, and thereafter informs the host computer 1 that communication with the host computer 1 ends. Subsequently, the service processor 3 activates the fault cause analyzing/processing facility 31 to cause it to analyze information stored in the fault information file of the hardware disc unit 4 so as to provide a fault cause and writes the fault cause in the fault cause analysis data storing file of the built-in hardware disc unit 4, thus completing a fault processing.

The verification operation for the fault detecting facility 11 and the fault cause analyzing/processing facility 31 will now be described.

Referring to FIG. 2, the pseudo-fault generation control unit 32 of the service processor 3 activates the random sequence test program 21 (step 201), designates a range, within which the random sequence test program 21 can generate faults, in accordance with an address loading on the memory storing the random sequence test program 21 (step 202), carries out a one-shot scan-in of error data for generation of a pseudo-machine check to,,the host computer 1 (step 203), and thereafter transfers the right to control to the random sequence test program 21 at predetermined time intervals and monitors the generation of faults (steps 204 and 205). While randomly selecting instructions executable on the partner host computer 1 and setting operand data, the random sequence test program 21 repeats operation to prepare an instruction string comprised of a plurality of instructions and the execute the instructions.

The one-shot scan-in operation is done in accordance with the FIG. 6 flow chart. When hardware accesses an address on the control memory (CS) by which scan-in of error data is triggered in the course of execution of an instruction by the random sequence test program 21 (step 601), a fault is padded in a corresponding hardware register (step 602). Then, during execution of the succeeding instruction by the random sequence test program 21, that hardware register is accessed to generate the fault. In FIG. 7, a MVC instruction (Move character) assigned with mark "*" represents a trigger instruction.

When the fault is generated and detected by the fault detecting facility 11, right to control is temporarily transferred to the fault recovery processing unit 12. As shown in FIG. 4, the fault recovery processing unit 12 resets the error (step 401), and thereafter resets control information on the random sequence test program 21 and transfers right to control to the random sequence test program 21 (step 402).

When the fault is detected, the host computer 1 on the other hand informs the service processor 3 of the detection of the fault and the service processor 3 being in receipt of this information activates the machine check handler to cause it to collect fault information and writes the collected information in the fault information file or management table of the built-in hardware disc unit 4. Subsequently, the host computer activates the fault cause analyzing/processing facility 31 to cause it to analyze information stored in the fault information file so as to provide a fault cause and writes the fault cause obtained thus in the management table of the built-in hardware disc unit 4.

Referring to FIG. 3, the analysis result detecting unit 33 repeats a read/store processing in respect of management table data before fault generation (step 301). After a fault is generated, the detecting unit 33 compares the contents of the management table which occurred before generation of the fault with that occurring after generation of the fault (step 202), and if fault data is collected to produce the difference in the contents (step 303), the detecting unit 33 retrieves a storage position of the analysis data in accordance with the difference in the contents, reads the fault analysis data and transfers right to control to the analysis result verifying unit 34. Referring to FIG. 5, with the fault generated (step 501), the analysis result verifying unit 34 compares the read-out fault analysis data with an expected value (step 502), and if non-coincident, it delivers a necessary message (step 503) and thereafter terminates the processing.

As is clear from the foregoing description, in accordance with the invention, fault cause analysis data can be detected efficiently and accurately from results of analysis conducted by the fault cause analyzing/processing facility and the fault detecting facility can be operated within a wide range through the use of a multi-run of the random sequence test program and verification program, thereby making it possible to efficiently perform automatic verification for the fault detecting facility and the fault cause analyzing/processing facility of the computer system throughout the whole of the processing sequence.

I claim:

1. An automatic verification system for a maintenance/diagnosis facility in a computer system comprising a host computer having a fault detecting facility and a fault recovery processing unit for performing a fault recovery processing when a pseudo-fault is generated, and a service processor comprising a fault cause analyzing/processing facility and a fault cause analysis data storing file, said service processor further comprising a pseudo-fault generation control unit for scanning in error data used to generate a pseudo-machine check for said host computer and for controlling a pseudo-fault generating memory address, an analysis result detecting unit for retrieving and extracting results of an analysis conducted by said fault cause analyzing/processing facility from said fault cause analysis data storing file, and an analysis result verifying unit for comparing the analysis results with an expected value to perform verification, and said computer system further comprising means for effecting the generation of the pseudo-fault by a multi-run of a verification program and a random sequence test program so that analysis data on the generated pseudo-fault is evaluated to automatically verify said fault detecting facility and said fault cause analyzing/processing facility.

2. The automatic verification system according to claim 1 wherein said analysis result detecting unit of said service processor automatically reads, according to software instructions, the contents of a management table of said fault cause analysis data storing file before and after the generation of the pseudo-fault, retrieves a storage position of the analysis data in accordance with a difference in the read contents, and reads only the analysis data from said fault cause analysis data storing file so as to perform automatic verification for said fault detecting facility and said fault cause analyzing/processing facility.

3. The automatic verification system according to claim 1 wherein faults are generated in parallel according to timings of the multi-run of the verification program and the random sequence test program whereby, after the scanning in of said error data, a variety of instruction strings based on a random sequence are generated and executed so as to perform automatic verification for said fault detecting facility and said fault cause analyzing/processing facility.

4. The automatic verification system according to claim 1 wherein said host computer is a computer which uses acceleration logic based on parallel processing.

5. The automatic verification system according to claim 4 wherein said host computer is a computer which uses pipe line control.

6. An automatic verification system for a maintenance/diagnosis facility in a computer system comprising a host computer having a fault detecting facility, and a service processor comprising a fault cause analyzing/processing facility and a fault cause analysis data storing file, said service processor further comprising a pseudo-fault generation control unit for generating a pseudo-machine check for said host computer by a scan-in of an error data facility, an analysis result detecting unit for retrieving and extracting results of an analysis conducted by said fault cause analyzing/processing facility from said fault cause analysis data storing file, and an analysis result verifying unit for comparing the analysis results with an expected value to perform verification, and said computer system further comprising means for effecting generation of a pseudo-fault by a multi-run of a verification facility and a random sequence program so that analysis data on the generated pseudo-fault is evaluated to automatically verify at least one of said fault detecting facility, said fault cause analyzing/processing facility, and said scan-in of said error data facility.

7. The automatic verification system according to claim 6 wherein said analysis result detecting unit of said service processor automatically reads, according to software instructions, the contents of a management table of said fault cause analysis data storing file before and after the generation of the pseudo-fault, retrieves a storage position of the analysis data in accordance with a difference in the read contents, and reads only the analysis data from said fault cause analysis data storing file so as to perform automatic verification for said fault detecting facility and said fault cause analyzing/processing facility.

8. The automatic verification system according to claim 6 wherein faults are generated in parallel according to timings of the multi-run of the verification facility and the random sequence program whereby, after said scan-in of said error data facility, a variety of instruction strings based on a random sequence are generated and executed so as to perform automatic verification for said fault detecting facility and said fault cause analyzing/processing facility.

9. The automatic verification system according to claims 6 wherein said host computer is a computer which uses acceleration logic based on parallel processing.

10. The automatic verification system according to claim 9 wherein said host computer is a computer which uses pipe line control.

11. The automatic verification system according to claim 6 wherein said host computer further comprises a fault recovery processing unit for performing a fault recovery processing when a pseudo-fault is generated.

12. The automatic verification system according to claim 6 wherein said service processor further comprises a fault recovery processing unit for performing a fault recovery processing when a pseudo-fault is generated.

13. The automatic verification system according to claim 6 wherein said pseudo-fault generation control unit is for scanning in error data used to generate a pseudo-machine check for said host computer and for controlling a pseudo-fault generating memory address.

14. The automatic verification system according to claim 6 wherein said means for effecting the generation of the pseudo-fault performs a concurrent operation of a verification facility and a random sequence program so that analysis data on the generated pseudo-fault is evaluated to automatically verify at least one of said fault detecting facility, said fault cause analyzing/processing facility, and said scan-in of said error data facility.

* * * * *